July 9, 1935.  R. R. HAUGH  2,007,195
METHOD AND APPARATUS FOR TESTING EGG QUALITY
Filed June 21, 1933
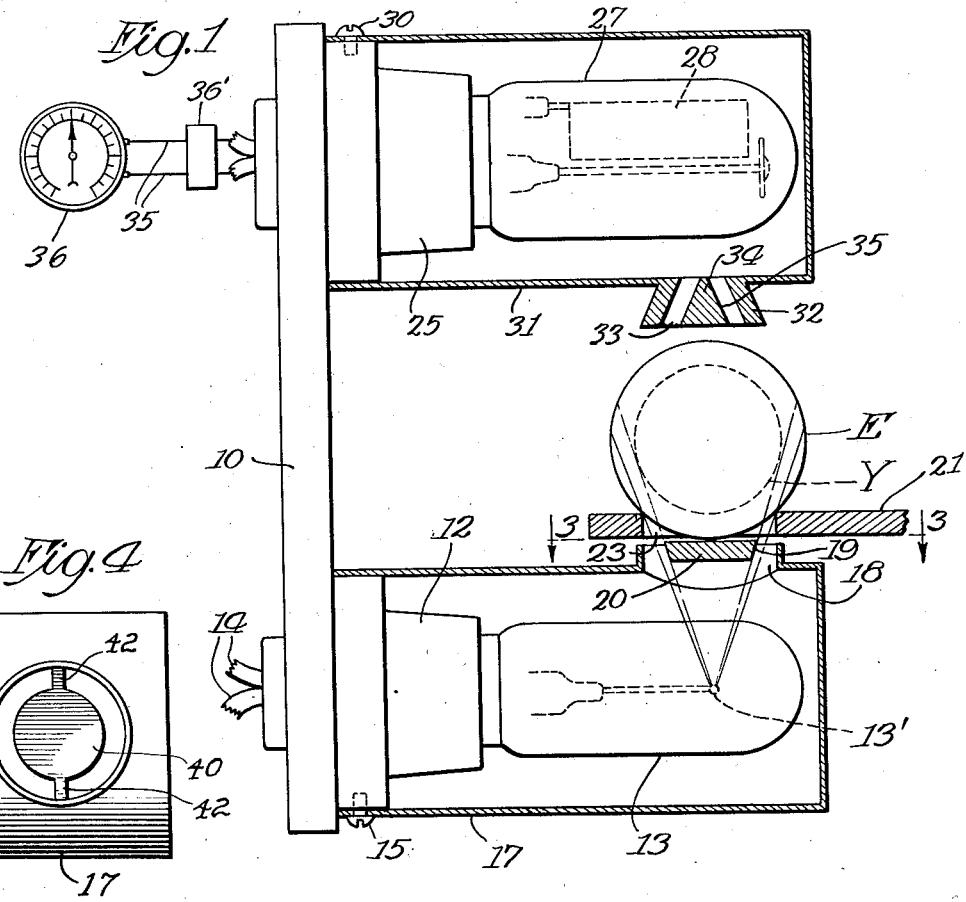
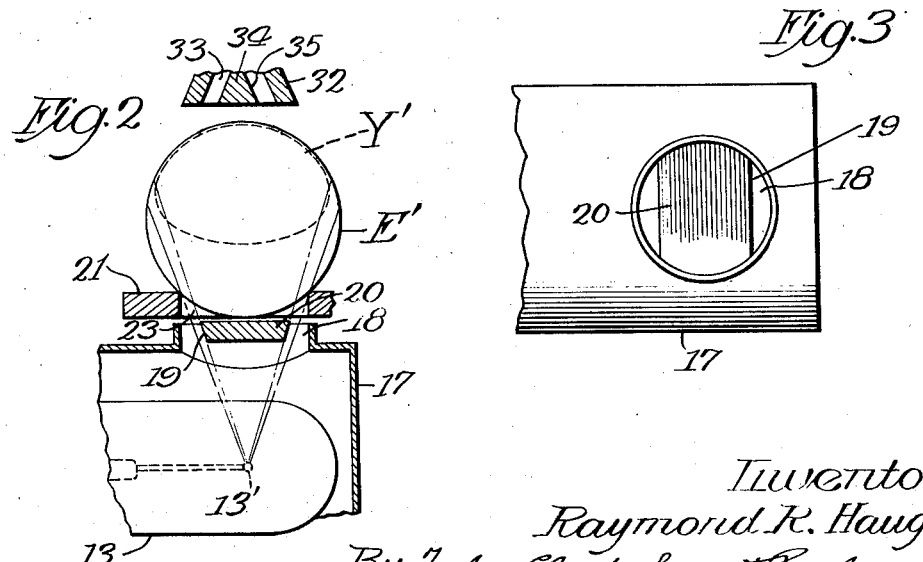
Inventor:
Raymond R. Haugh
By Fisher, Clapp, Soans & Pond, Attys.

Patented July 9, 1935

2,007,195

UNITED STATES PATENT OFFICE 2,007,195

METHOD AND APPARATUS FOR TESTING EGG QUALITY

Raymond R. Haugh, Chicago, Ill., assignor, by mesne assignments, to Kraft Egg Machine Company, Chicago, Ill., a corporation of Delaware Application June 21, 1933, Serial No. 676,774

10 Claims. (Cl. 99—6)

My invention relates to the testing of eggs to determine the quality or grade thereof, and has for a particular object the provision of improved method and apparatus which will make possible such testing in a rapid, convenient, and economical manner without fatigue to an operator, and with a high degree of accuracy.

A further object is to provide such a device which will mechanically indicate the quality of an egg and will thus avoid any errors due to the human factor.

Still another object is to provide such a device which will be simple in construction, economical to make and maintain, rugged, and easy to operate.

Various other objects and advantages will suggest themselves to those skilled in the art as the description proceeds.

Referring now to the drawing forming a part of the specification and illustrating a preferred embodiment of my invention:—

Fig. 1 represents a vertical sectional view through a device embodying my invention.

Fig. 2 is a similar fragmentary view of the same and showing the operation thereof in connection with a deteriorated egg.

Fig. 3 is a top plan view taken along the line 3—3 of Figure 1, and

Fig. 4 is a view similar to Figure 3 and showing a modification of my invention.

The numeral 10 represents a support which may be of any suitable type, such as a board, wall, or the like on which is mounted a socket 12 for an electric lamp 13 of any suitable type, having a light-generating filament 13'. A pair of conductors 14 serve to convey current to the socket 12 for illumination of the lamp 13.

Secured to the socket 12 as by means of a screw 15 or the like is a housing 17 formed of metal or other suitable material, and having an opening 18 for the exit of light from within the housing. Since a hollow beam appears to be advantageous, a shield 20 is secured to the housing adjacent the opening 18, as by solder or the like. Said shield may be in the form of a flat strip of metal or other suitable material, and preferably has edges 19 which are beveled, as shown. An egg-supporting device 21, which may be a traveling belt or a fixed member, with an aperture 23 for the seating of an egg, is provided above the opening 18.

Also mounted on the support 10 and spaced from the socket 12, preferably thereabove, is a socket 25. Seated in the socket 25 is a photo-electric cell 27 which may be of any suitable type but is preferably of the electronic type, which will provide a substantially constant current for light of a given intensity and is not appreciably subject to fatigue. Such a cell is provided with a cathode 28 from which electrons are emitted when light falls thereon.

Secured to the socket 25 by suitable means, such as a screw 30, is a light-proof housing 31 formed of suitable material, such as metal or the like, and provided with a flange 32 defining a tapered, preferably conical, opening 33 for the transmission of light into the housing and upon the photo-electric cell. A shield 34 is arranged within the opening 33 having a tapered inner wall 35 corresponding to the taper of the flange 32, whereby a hollow beam of light enters the housing 31. The shields 20 and 34 co-operate to effectively prevent the passage of any substantial quantity of light through the yolk and upon the cell 27.

Connected to the cell 27 by conductors 35 is a suitable device 36, such as a micro-ammeter, for measuring minute variations of current. An amplifier 36' may be disposed in the circuit.

The operation of my improved device is substantially as follows: A current is turned on in the circuit feeding the lamp 13 and an egg E is disposed in the aperture 23 with its longitudinal axis preferably parallel to that of the shield 20, as clearly shown in Figures 1 and 2. If the egg is of good quality, the albumen or "white" will be in thick condition and the yolk Y will, therefore, be retained in a position substantially centrally of the vertical axis of the egg, as clearly shown in Figure 1. As clearly seen in Figure 1, the light will pass on opposite sides of the shield 20 and through the egg shell and will be reflected from the inner walls thereof and from the surface of the yolk into the housing 31, whence it will fall upon the photo-electric cell, thus providing a reading of the meter 36. It will thus be apparent that in eggs of good quality the readings should be substantially the same, inasmuch as the light will in all cases be transmitted through the white of the egg which is of substantially the same color in all types of eggs of good quality. The color of the shell is a negligible factor.

Should, however, the egg be deteriorated or partially deteriorated, the white, instead of being sufficiently stiff to retain the yolk in a central position as shown in Figure 1, will be thin and watery and, hence, will permit the yolk, which is normally lighter than the material of the white, to rise against the upper portion of the shell, where it will tend to flatten, substantially as shown in Figure 2. It has been found that the yolk of a deteriorated egg will quickly assume this position, regardless of how it may be rotated before it comes to a position of rest.

In such a condition, therefore, when a bad egg E' is seated above the lamp 13, the light from the filament 13' will pass not only through the shell and white but also into the yolk of the egg and be largely absorbed thereby; hence, the amount of light which will fall upon the photoelectric cell will be appreciably less than in the case of an egg of high quality, as shown in Figure 1, because of the filtering action of the yolk Y'. Of course, there are various stages of deterioration, wherein the yolk will occupy various positions, in the worst stages being flattened against the upper wall of the egg. Hence, it will be obvious that for such various stages of deterioration the meter 36 will give various readings and the eggs may be quickly and accurately classified and graded by my device, according to their degree of freshness or deterioration. By means of the shields 20 and 34, preventing registering of light which passes through the yolk, the accuracy of the device is greatly increased.

It will be apparent, therefore, that by means of my device eggs may be tested and graded with much greater speed and accuracy than by methods which depend upon the eyesight of an operator. It has been found that there is a very important factor of personal judgment in the testing of eggs, one operator considering an egg good while another may consider the same egg unfit for use. Eye fatigue is also a source of error in ordinary candling. By means of my apparatus such human factors are eliminated and the eggs are positively graded according to a fixed standard.

Figure 4 shows a modification wherein there is employed a shield 40 corresponding to the member 20 of Figure 3. The shield 40 comprises a plate which may be approximately circular so as substantially to bar light from an egg yolk, and this circular plate is connected by means of webs 42 to the housing 17. This embodiment has an advantage in that it permits the passage of somewhat more light than the embodiment shown in Figure 3.

It will be understood that this shield may be still further modified so as to prevent error due to the presence of the air cell which is always present at one end of an egg.

Various modifications and improvements coming within the spirit of my invention will doubtless suggest themselves to those skilled in the art. Hence, I do not wish to be limited to the specific details shown or uses mentioned except to the extent indicated in the appended claims, which are to be interpreted as broadly as possible consistent with the prior art.

I claim as my invention:

1. In an egg-testing device, a photo-electric element, means for indicating variations in light falling on said element, and means in vertical alignment with said element for projecting light through the outer marginal portions of an egg while preventing the direct passage of light through the central portion thereof, whereby only the light transmitted through said marginal portions will be reflected upon said element.

2. In an egg-testing device, a photo-electric element, means for indicating variations in light falling on said element, a light source in vertical alignment with said element, means for projecting a beam of light from said source to said element, and a shield associated with said last-named means for barring light from the central portion of an egg being tested.

3. In an egg-testing device of the class described, a photo-electric element, means for indicating variations in light falling on said element, a light source in vertical alignment with said element, a housing for said source having an opening therein opposite said element, and a shield mounted adjacent said opening for barring the transmission of light from the central portion of an egg being tested.

4. In an egg-testing device, a photo-electric element, means for indicating variations in light falling on said element, a light source in vertical alignment with said element, a housing for said source having an opening therein opposite said element, a shield mounted adjacent said opening for barring the transmission of light from the central portion of an egg being tested, and means for positioning an egg between said shield and element.

5. In an egg-testing device, a photo-electric element, means for indicating variations in light falling on said element, a housing for said element having an opening therein to permit passage of light into said housing and onto said element, a light source, a housing for said source having a substantially circular opening of area materially less than the area of an egg-cross-section arranged vertically opposite that of the housing for said photo-electric element, and a shield arranged substantially centrally of said last-mentioned opening whereby light will be barred from the central portion of an egg to be tested when disposed over said opening.

6. In an egg-testing device, a photo-electric element, means for indicating variations in light falling on said element, a housing for said element having an opening therein to permit passage of light into said housing and onto said element, a light source under said opening, a housing for said source having an opening arranged under said first opening, a shield arranged substantially centrally of said last-mentioned opening whereby light will be barred from the central portion of an egg to be tested when disposed over said opening, and means for positioning an egg between said openings.

7. The method of classifying a batch of eggs according to quality which consists in determining the vertical deviation of the yolk of a standard egg relative to the egg center while the egg is prevented from rotating around a horizontal axis, making similar determinations with the eggs which are to be tested, and then grading the eggs in accordance with the variation in the results obtained.

8. A method of classifying a batch of eggs according to quality, whch consists in projecting a beam of light through the eggs to be tested and upon a photo-electric cell while substantially preventing impingement on said cell of any light transmitted through the yolk of said eggs, measuring the electrical effects produced in said cell, and comparing the same with the effect produced by a standard egg when similarly treated.

9. In an egg-testing device, a photo-electric element, means for indicating variations in light falling on said element, a light source in vertical alignment with said elements, egg-seating means therebetween, and means for substantially preventing impingement on said element of light transmitted through the yolk portion of an egg being tested, while permitting impingement thereon of light transmitted through other portions of said egg.

10. In an egg-testing device, a photo-electric element, means for indicating variations in light falling on said element, a light source in vertical alignment with said elements, egg-seating means therebetween, a shield mounted adjacent said light source for barring the transmission of light through the central portion of an egg being tested, and another shield arranged adjacent said photo-electric element for barring therefrom light from the central portion of said egg.

RAYMOND R. HAUGH.